April 14, 1931.  J. F. DUBY  1,800,442

VEHICLE STABILIZER

Filed March 26, 1929   2 Sheets-Sheet 1

INVENTOR.
John F. Duby
BY Roberts, Cushman & Woodbury

ATTORNEY.

Patented Apr. 14, 1931

1,800,442

UNITED STATES PATENT OFFICE

JOHN F. DUBY, OF BOSTON, MASSACHUSETTS

VEHICLE STABILIZER

Application filed March 26, 1929. Serial No. 349,999.

This invention relates to improved suspension and steering stabilizing means for vehicles, being particularly adapted to permit the more steady steering of the same by neutralizing shocks which would otherwise be imparted to the steering control members and by reducing or avoiding the tendency toward shimmy or periodic transverse vibrations.

In vehicles equipped with low pressure tires and running at high speeds, periodic transverse vibrations tends to become objectionable under certain conditions, such a phenomenon commonly being termed "shimmy". While a plurality of factors may contribute to produce this objectionable vibratory effect which renders steering uncertain and unfavorably affects the riding qualities of the vehicle, it is particularly noticeable that shimmying tends to occur with cars equipped with low pressure tires which are readily deformed upon passing over irregularities in the road. Such deformation causes a material reduction in the effective radius of the tire, while the rotary inertia of the wheel tends to make it maintain a uniform rotary or angular speed. Accordingly the compressed peripheral portion of the tire which is in engagement with the road surface at the instant of deformation tends to cause that wheel to move more slowly than the remainder of the vehicle, and to give an instantaneous or momentary braking effect which pulls the adjoining portion of the axle back in relation to the rest of the vehicle, tending to cause vibratory movement of the axle in a more or less horizontal plane with the resultant objectionable periodic movement of the front portion of the vehicle frame. Furthermore, movement of the front axle in a substantially vertical direction when the vehicle is passing over a protuberance or depression in the roadway tends to move the front portion of the drag link in a substantially vertical plane, while, due to the pivotal connection of the rear portion of this link with the steering control arm, it is normally constrained to move in a curved path. The resultant effect often is a tendency either to cause objectionable movement of the steering wheel, if the control mechanism is not substantially irreversible, or to cause undesirable pivoting of the front wheels about the axle of their supporting knuckles.

In accordance with the present invention, stabilizing means is provided to permit the limited movement of the front axle in a substantially horizontal direction and to provide yieldable opposition to such a movement so that a momentary braking effect resulting, for example, from the compression of one of the front tires may cause the corresponding portion of the axle to be moved a slight distance horizontally in relation to the chassis frame. Due to the yieldable connection permitting this relative horizontal movement, the strain which is thrown upon the front portion of the frame is materially less than that which occurs with the conventional spring suspension system. Furthermore, absorption of shocks in a horizontal direction is permited so that the riding qualities of the vehicle are improved. While various means may be provided to permit and yet yieldably to oppose the horizontal movement of the front axle in relation to the chassis frame, I prefer to arrange connections pivoted to the ends of each semi-elliptical spring and to extensions of the chassis frame in such a manner that movement of the axle forwardly or rearwardly from its normal position in relation to the chassis frame is opposed by a tendency to lift the frame and the weight carried thereon.

While a slight longitudinal movement of the axle ends in relation to the vehicle frame is thus advantageous in reducing or eliminating the tendency of the front end of the vehicle to set up periodical vibrations, i. e., to shimmy, such relative movement between the axle and the frame would not be satisfactory with the conventional steering linkage, since it would tend either to set up an undesired pivotal movement of the dirigible front wheels or it would impart unnecessary and unpleasant shocks to the steering control mechanism and to the steering wheel.

Accordingly the present invention provides means connected to the steering control member to compensate for the horizontal movement of the axle and for the movement of the drag link which results from the axle movement, so that the angular position of the dirigible front wheels in relation to the axle is substantially unchanged despite the fore and aft movement of the latter. To this end, I connect the conventional steering arm crank to the intermediate portion of a lever, the lower end of which is connected to the rear portion of the drag link and the upper portion of which is pivotally connected to a suitable fulcrum member that is controlled through appropriate linkage designed to move the upper end of the lever in a direction opposite to the direction of axle movement so that the effect of the same is neutralized in so far as the steering arm is concerned.

In the accompanying drawings.

Figure 1:
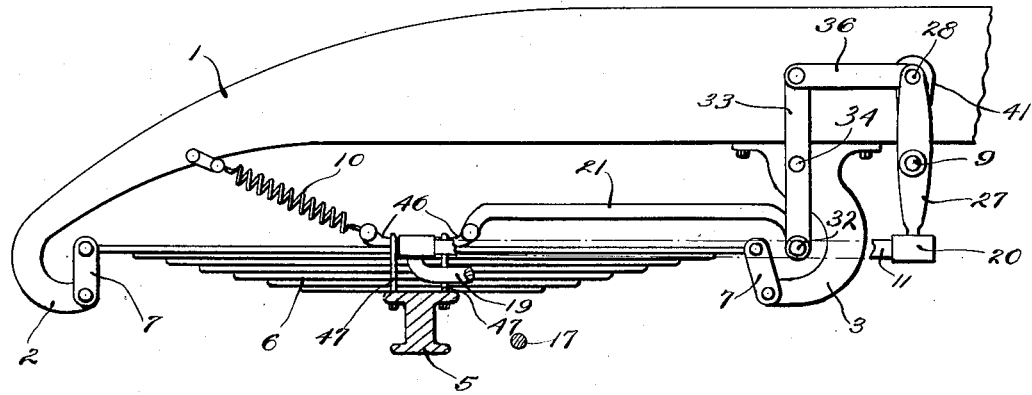
Fig. 1 is a side elevation of a front portion of a vehicle frame and adjoining parts of the steerage linkage and spring suspension means, the axle and related parts being shown in section as indicated by line 1—1 of Fig. 2. and certain parts being broken away.
Figure 2:
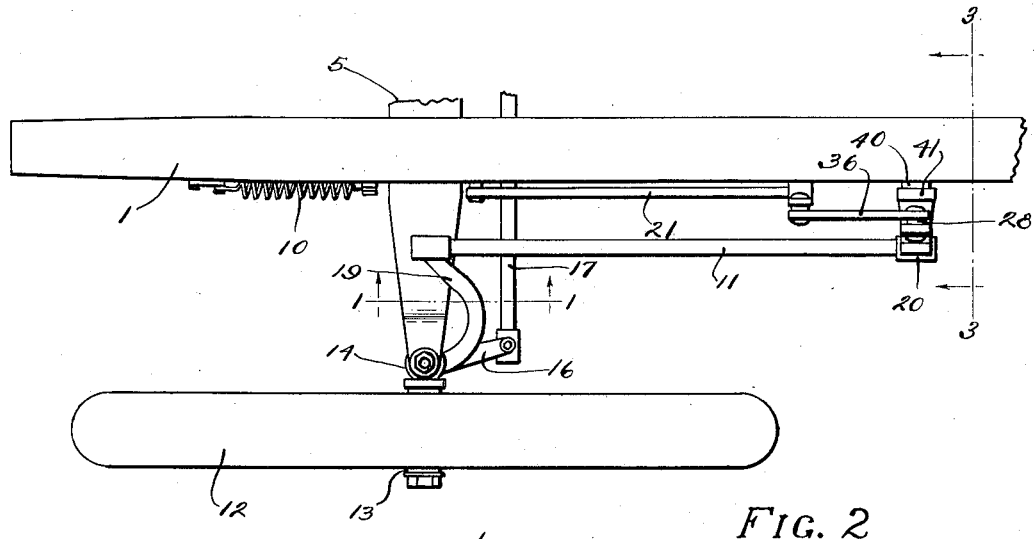
Fig. 2 is a top plan view of a front corner of the vehicle shown in Fig. 1.
Figure 3:
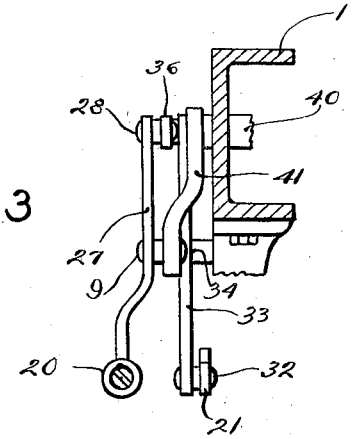
Fig. 3 is a section on line 3—3 of Fig. 2.

Referring to the accompanying drawings and first more particularly to Figs. 1, 2 and 3 thereof, it may be seen that the numeral 1 designates a conventional chassis frame which may have a down-turned end portion or spring horn 2 at its front end. A front axle 5 is disposed beneath the frame 1 and carries a leaf spring 6 thereon which, as shown, may be of the conventional substantially flat, semi-elliptical type. Frame 1 carries a depending bracket 3 adjoining the rear portion of this spring. Shackles 7 are pivotally connected to each end of the spring 6 and to the spring horn 2 and bracket 3 respectively. It is evident that this arrangement permits the depending extensions of the frame to be hung from the ends of the spring in such a manner that limited backward and forward movement between the spring and frame may occur, the shackles 7 pivoting about their connections to the frame extensions as centers of rotation during such a movement so that it will cause a slight lifting of the frame in relation to the spring and axle. In other words, the weight of the chassis frame and parts carried thereby normally will cause the axle to occupy a certain position in relation to the vehicle frame and will yieldably oppose the horizontal movement of the axle out of this position. In order to aid in permitting the return of the axle to its normal position I may provide an auxiliary spring 10 connected to the axle and a suitable portion of the frame 1, as shown.

While a limited horizontal movement of the axle is desirable for the reasons set forth above, such a movement would tend to have an objectionable effect upon the steering qualities of the vehicle unless means were provided to compensate for this tendency. One such arrangement is shown in Figs. 1, 2 and 3 wherein the front wheel 12 is of the conventional dirigible type being carried upon a stub axle 13 which is integral with a steering knuckle 14 having a rearwardly extending arm 16 that is connected to tie rod 17. A curved arm 19 also connects knuckle 14 to the front portion of the drag link 11 which may have the usual pivotal or ball and socket connection with the arm 19.

The steering control linkage may be conventional, comprising a rotatable shaft 40 extending from the steering mechanism (not shown), to the depending crank arm 41. This control arm instead of being connected directly to the rear end of the drag link is pivotally connected to the intermediate portion of a lever 27, as designated by the numeral 9. The lower end of lever 27 has the conventional ball and socket connection 20 with the rear end of drag link 11, while its upper end preferably is pivotally connected to a movable fulcrum 28, suitable linkage being provided to cause a movement of this fulcrum to compensate for the movement of the front portion of the drag link in response to changes in position of the axle so that such movement does not affect the steering qualities of the vehicle.

As shown in Fig. 1, for example, fulcrum 28 may be connected to a substantially horizontally disposed link 36, the front portion of which is pivotally connected to a lever 33 that swings about an intermediate pivot 34 upon the chassis frame. The lower end of lever 33 is pivotally connected, as designated by numeral 32, to a longitudinally disposed link 21, that in turn is pivotally connected to a plate 46 which is clamped to the axle by means of the spring clips 47 or the like. Coil spring 10 also may be conveniently connected to plate 46.

Movement of the axle backwardly or forwardly in relation to the vehicle frame causes a similar movement to be imparted to the link 21 which causes the upper portion of lever 33, link 36 and fulcrum 28 to move in an opposite direction. The horizontal movement of the rear portion of drag link 11 due to the movement of the vehicle axle in relation to the vehicle frame is thus offset by a movement in the opposite direction of the fulcrum 28 so that the effect of such a movement of the drag link upon the steering control member 41 is neutralized; accordingly the freedom of longitudinal movement of the axle permitted in accordance with my invention does not objectionably affect the steering control mechanism. On the other hand, such a movement of the axle does not cause swinging of the steering knuckles about the king pins, since any relative movement between the drag link and the control member which might occur due to this arrangement of the spring suspension means is neutralized.

Figure 4:
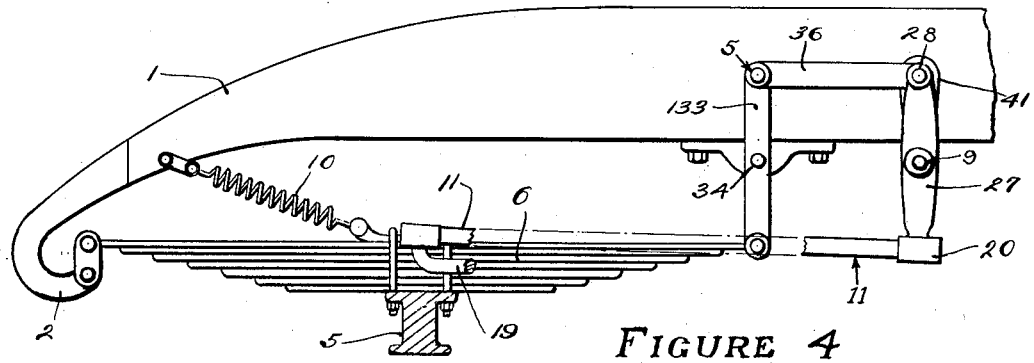
Figs. 4, 5 and 6 are views similar to Fig. 1 but showing further adaptations of my invention.

Fig. 4 shows a slightly different embodiment of the invention wherein the lever 36 is connected to an arm 133 which forms the other plate of the shackle between the rear portion of leaf spring 6 and the vehicle frame. It is evident that longitudinal movement of the axle and spring will cause a movement of the upper end of the lever 133 and of fulcrum 28 in the same manner as described with reference to Fig. 1, thereby neutralizing the objectionable effect such movement of the axle and spring might otherwise have upon the steering qualities of the vehicle.

Figure 5:
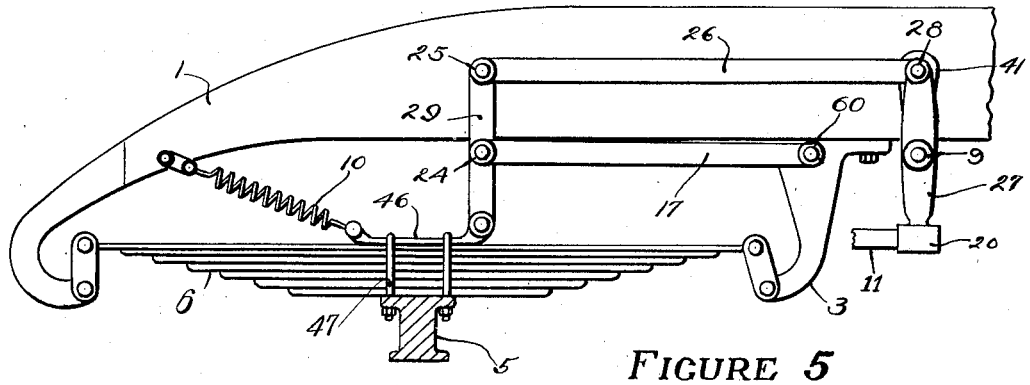

Fig. 5 illustrates a slightly different arrangement wherein the fulcrum 28 is carried upon an elongate link 26, the front portion of which is pivotally connected, as designated by numeral 25, to a lever 29, while the lower end of the latter is pivotally connected to plate 46 in the same manner as described with reference to Fig. 1 and its intermediate portion is connected to link 17. The rear end of the latter is pivotally connected to the frame, as designated by numeral 60. It is evident that the link 26 is thus caused to move in a direction opposite to the direction of spring and axle movement and thus to cause the movement of fulcrum 28 in a similar manner, and to neutralize the effect of the axle movement upon the steering linkage and control mechanism. Link 17 is adapted to swing about the fixed pivot 60, which is located adjoining the rear end of the leaf spring, in response to vertical movement of the axle and frame but provides a fulcrum 24 that is substantially fixed in so far as horizontal movement of the parts is concerned.

Figure 6:
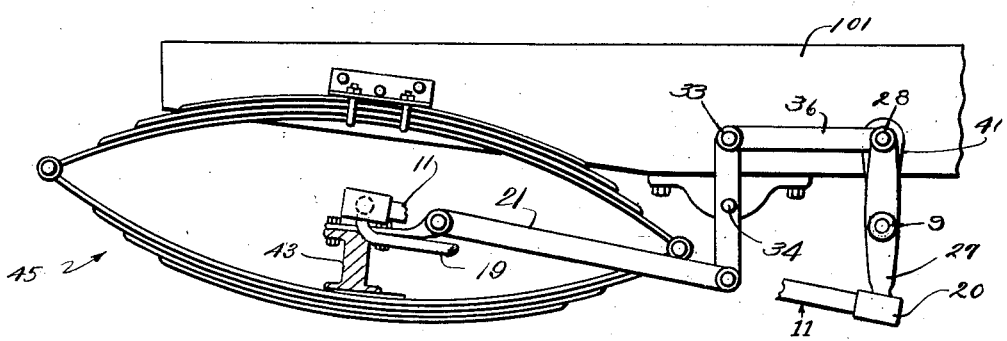

Fig. 6 illustrates means similar to that shown in Fig. 1 used in conjunction with a full elliptic spring 45 which is connected to an axle 43 that may be offset slightly in relation to the connection between the upper portion of the spring and the vehicle frame 101. In other words, the full elliptic spring may be inclined slightly in order to afford greater yieldability in a horizontal direction and thus to permit a limited backward and forward movement of the axle in relation to the vehicle frame. With this embodiment of the invention, linkage similar to that shown in Fig. 1 and similarly designated may be utilized to neutralize the effect of the longitudinal movement of the axle upon the steering mechanism.

While I have shown for example levers which have their intermediate pivots located substantially half way between their ends so that their opposite ends move substantially equal distances in opposite directions, it is evident that the proportions of the various parts of the levers may be varied if desired. It is preferable, however, to arrange the same in such a manner that the rearward movement of the fulcrum 28 will impart such an angular movement to the lever 27 as to compensate for the movement of its lower end in the opposite direction so that the lever will merely swing about its connection with the steering crank 41.

It is evident that this invention affords means adapted to permit limited backward and forward movement of the axle in relation to the vehicle frame and provides compensating means to prevent the movement of the axle in this manner or tendency of the front end of the drag link to change its position in relation to the end of the steering crank arm due to axle movement from adversely affecting the steering qualities of the vehicle. Thus means are provided permitting the limited absorption of shocks imparted in a horizontal direction and neutralizing the adverse effect of the momentary braking action, which heretofore has tended to cause shimmying, so that the riding and steering qualities of the vehicle are enhanced and stabilized.

I claim:

1. A vehicle comprising a chassis frame, an axle, dirigible wheels connected to the axle, yieldable means connecting the axle and frame and permitting relative movement therebetween, a drag link connected to the dirigible wheels, a control member for imparting steering movement to said link, a lever pivotally connected to the control member, to the link and to a fulcrum, said fulcrum being movable in response to a movement of the axle causing horizontal movement of the rear end of the drag link, so that the tendency of such movement to affect the position of the steering control member is neutralized.

2. A vehicle comprising a chassis frame, an axle, dirigible wheels connected to the axle, springs between the axle and frame permitting relative movement therebetween, a drag link connected to the dirigible wheels, a control member for imparting steering movement to said link, a lever having its mid-portion pivotally connected to the control member and its ends to the link and to a fulcrum respectively, a second lever having an intermediate pivotal connection to the frame, said second lever having one end connected to the axle and the other end connected to said fulcrum, whereby substantially horizontal movement of the drag link in one direction, in response to axle movement, is compensated for by movement of the fulcrum in the opposite direction so that the control member is unaffected by relative movement of the front axle and frame, and whereby tendency of such movement to affect the steering control member is neutralized.

3. A vehicle comprising a chassis frame, an axle, dirigible wheels connected to the axle, a spring between the axle and frame, a drag link connected to the dirigible wheels, a control member for imparting steering movement to said link, a lever having its mid-portion pivotally connected to the control member, and its end pivotally connected to the link and to a fulcrum, a second lever having an intermediate pivotal connection to the frame, said second lever having one end connected to the axle, a link pivotally connected to the opposite end of said second lever and to said fulcrum, whereby the upper end of the levers both move oppositely to the direction of movement of the end of the drag link that is connected to the control member, whereby movement of that end of the drag link in one direction, due to axle movement, is compensated for by movement of the fulcrum in the opposite direction so that the control member is unaffected by such a movement of the drag link.

4. A vehicle comprising a chassis frame, an axle, dirigible wheels connected to the axle, a spring between the axle and frame, means associated with the spring permitting and yieldably opposing horizontal movement of the axle, a steering link connected to the dirigible wheels, a control member for imparting steering movement to said link, a lever pivotally connected to the control member, to the link and to a fulcrum, said fulcrum being movable in response to the horizontal movement of the axle, whereby the tendency of this movement to affect the steering control member is compensated for.

5. A vehicle comprising a chassis frame, an axle, dirigible wheels connected to the axle, a spring between the axle and frame, shackle elements pivotally connected to the spring ends and to the frame in such a manner that horizontal shock imparted to the axle may cause horizontal movement thereof and lifting of the frame yieldably to oppose said shock, a drag link connected to the dirigible wheels, a control member for imparting steering movement to said link, a lever pivotally connected to the control member, to the link and to a fulcrum, a longitudinally disposed link, a second lever having an intermediate pivotal connection to the longitudinally disposed link, the latter being pivotally connected to the frame in the region of the rear end of the spring, said second lever having one end connected to the axle and the other end connected to said fulcrum, whereby horizontal movement of the axle and link in one direction is compensated for by movement of the fulcrum in the opposite direction so that the control member is unaffected by horizontal movement of the axle.

6. A vehicle comprising a chassis frame, an axle, dirigible wheels connected to the axle, a spring between the axle and frame, shackle elements pivotally connected to the spring ends and to the frame in such a manner that horizontal shock imparted to the axle may cause horizontal movement thereof and lifting of the frame yieldably to oppose said shock, a drag link connected to the dirigible wheels, a control member for imparting steering movement to said link, a lever having an intermediate pivotal connection to the control member, its lower end connected to the rear end of the link and its upper end connected to a fulcrum, a second lever having an intermediate pivotal connection to the frame, said second lever having its lower end connected to the axle, a link pivotally connected to the upper end of said second lever and to said fulcrum, whereby the upper ends of the levers move in unison oppositely to the direction movement of the drag links rear end in response to axle movement, whereby horizontal movement of rear end of the drag link in one direction is compensated for by movement of the fulcrum in the opposite direction so that the control member is unaffected by horizontal movement of the axle.

7. A vehicle comprising a chassis frame, an axle, dirigible wheels connected to the axle, a spring between the axle and frame, shackle elements pivotally connected to the spring ends and to the frame in such a manner that horizontal shock imparted to the axle may cause horizontal movement thereof and lifting of the frame yieldably to oppose said shock, a steering link connected to the dirigible wheels, a control member for imparting steering movement to said link, a lever pivotally connected to the control member, to the link and to a fulcrum, said fulcrum being movable in response to the horizontal movement of the axle in a direction opposite to the same, whereby the tendency of this movement to affect the steering control member is compensated for.

8. A vehicle comprising a chassis frame, an axle, dirigible wheels connected to the axle, a spring between the axle and frame, shackle elements pivotally connected to the spring ends and to the frame in such a maner that horizontal shock imparted to the axle may cause horizontal movement thereof and lifting of the frame yieldably to oppose said shock, a steering link connected to the dirigible wheels, a control member for imparting steering movement to said link, a lever pivotally connected to the control member, to the link and to a fulcrum, a second lever having an intermediate pivotal connection to the frame, said second lever having one end connected to the axle and the other end connected to said fulcrum, whereby horizontal movement of the axle and link in one direction is compensated for by movement of the fulcrum in the opposite direction so that the control member is unaffected by horizontal movement of the axle.

9. In a vehicle, a chassis frame, an axle, yieldable means disposed between the same and arranged to cushion vertical shock, said means being arranged to permit a limited horizontal movement of the axle in relation to the frame upon a horizontal thrust being imparted to the axle, and auxiliary spring means to oppose said movement.

10. A vehicle comprising a chassis frame, an axle, a main spring between the axle and frame, shackle elements pivotally connected to the spring ends and to the frame in such a manner that horizontal shock imparted to the axle may cause horizontal movement thereof and lifting of the frame yieldably to oppose said movement, and an auxiliary spring between the axle and frame also adapted to oppose said movement.

11. A vehicle comprising a chassis frame, an axle, a spring, dirigible wheels connected to the axle, shackle elements pivotally connected to the spring ends and to the frame in such a manner that horizontal shock imparted to the axle may cause its horizontal movement, and a supplementary spring opposing said movement.

12. In a vehicle, a chassis frame, an axle, yieldable means disposed between the same and arranged to cushion vertical shock, said means being arranged to permit a limited horizontal movement of the axle in relation to the frame upon a horizontal thrust being imparted to the axle, auxiliary spring means to oppose said horizontal movement, and dirigible wheels connected to the axle, steering linkage connected to the wheels, a control member for imparting steering movement to the linkage, and means for neutralizing the effect of the horizontal movement of the axle upon the steering linkage so that the relation of the latter to the wheels is not altered by said horizontal movement.

13. In a vehicle, a chassis frame, an axle, a leaf spring supported by the axle, depending connections secured to the ends of the spring and to the frame and permitting a limited horizontal movement of the axle in relation to the frame, a supplementary spring opposing said horizontal movement, dirigible wheels connected to the axle, steering linkage, a control member for imparting steering movement to the linkage, and means for neutralizing the effect of the horizontal movement of the axle upon the steering linkage so that the relation of the latter to the wheels is not altered by said horizontal movement.

Signed by me at Boston, Massachusetts, this fifteen day of March, 1929.

JOHN F. DUBY.